United States Patent
Nakasha

(10) Patent No.: US 8,311,151 B2
(45) Date of Patent: Nov. 13, 2012

(54) PULSE RADIO TRANSMISSION APPARATUS AND TRANSCEIVER

(75) Inventor: Yasuhiro Nakasha, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 756 days.

(21) Appl. No.: 12/401,356

(22) Filed: Mar. 10, 2009

(65) Prior Publication Data

US 2010/0061483 A1  Mar. 11, 2010

(30) Foreign Application Priority Data

Mar. 14, 2008 (JP) .................................. 2008-065133

(51) Int. Cl.
*H04L 27/04* (2006.01)

(52) U.S. Cl. ........ 375/300; 375/237; 375/238; 375/239; 375/259; 375/260; 375/285; 375/295

(58) Field of Classification Search .......... 375/295–296, 375/285, 300, 237–239, 299, 309, 259, 260; 327/164, 144, 173–174, 237, 291, 261; 341/173, 341/178–179, 189
See application file for complete search history.

(56) References Cited

U.S. PATENT DOCUMENTS

| | | | | |
|---|---|---|---|---|
| 5,481,228 A | * | 1/1996 | Badyal | 331/74 |
| 6,819,155 B1 | * | 11/2004 | Ling et al. | 327/175 |
| 6,882,197 B2 | * | 4/2005 | Griessbach | 327/175 |
| 7,292,620 B2 | * | 11/2007 | Green et al. | 375/146 |
| 7,751,719 B2 | * | 7/2010 | Wang et al. | 398/155 |
| 2006/0045177 A1 | * | 3/2006 | Kurashima et al. | 375/239 |
| 2006/0234761 A1 | * | 10/2006 | Nagasaka | 455/552.1 |

FOREIGN PATENT DOCUMENTS

JP  2006-303705  11/2006

OTHER PUBLICATIONS

Park et al. "Low complexity impulse radio based UWB (IR-UWB) transceiver", IEEE Jun. 2007.*

* cited by examiner

*Primary Examiner* — Sam K Ahn
*Assistant Examiner* — Sophia Vlahos
(74) *Attorney, Agent, or Firm* — Fujitsu Patent Center

(57) ABSTRACT

A radio transmission apparatus has a first duty adjustment circuit which changes a duty ratio of a clock signal, a second duty adjustment circuit which changes the duty ratio of the clock signal to a duty ratio different from the duty ratio of the clock signal changed by the first duty adjustment circuit, a first AND circuit which takes a logical product between a data signal and the clock signal having passed through the first duty adjustment circuit, and a second AND circuit which takes a logical product between an output signal of the first AND circuit and the clock signal having passed through inversion of the output of the second duty adjustment circuit to generate a pulse signal.

13 Claims, 11 Drawing Sheets

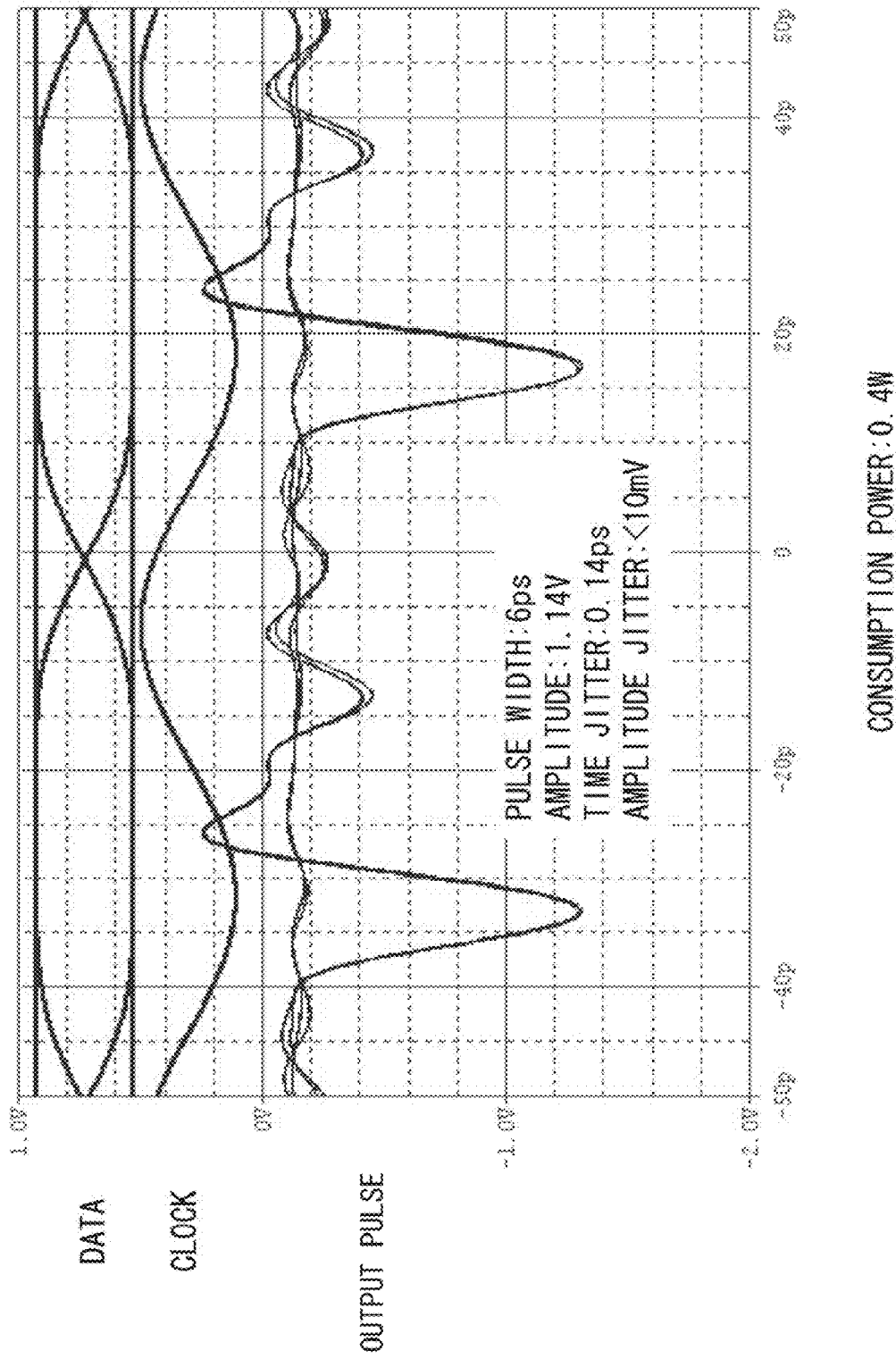

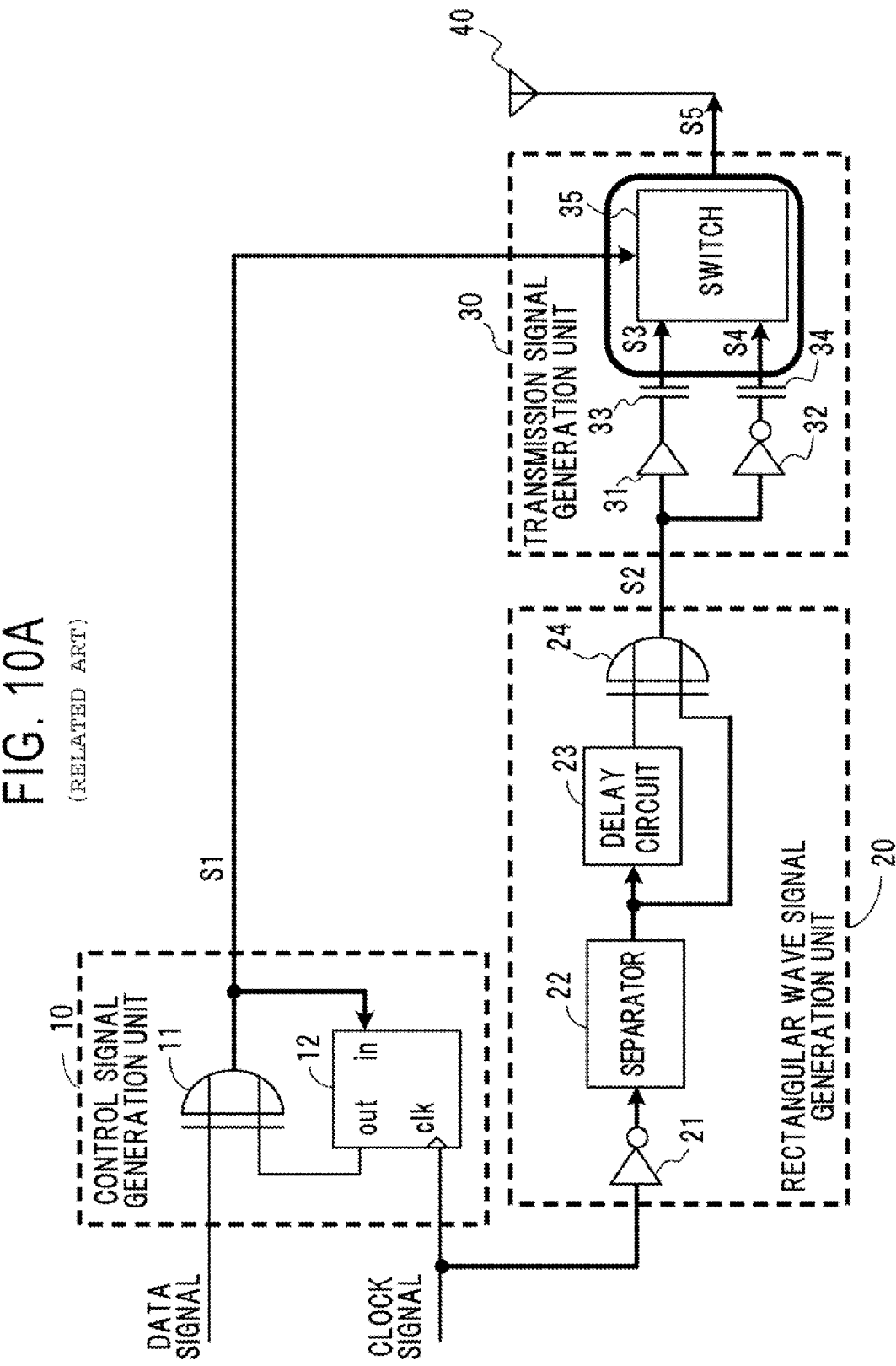

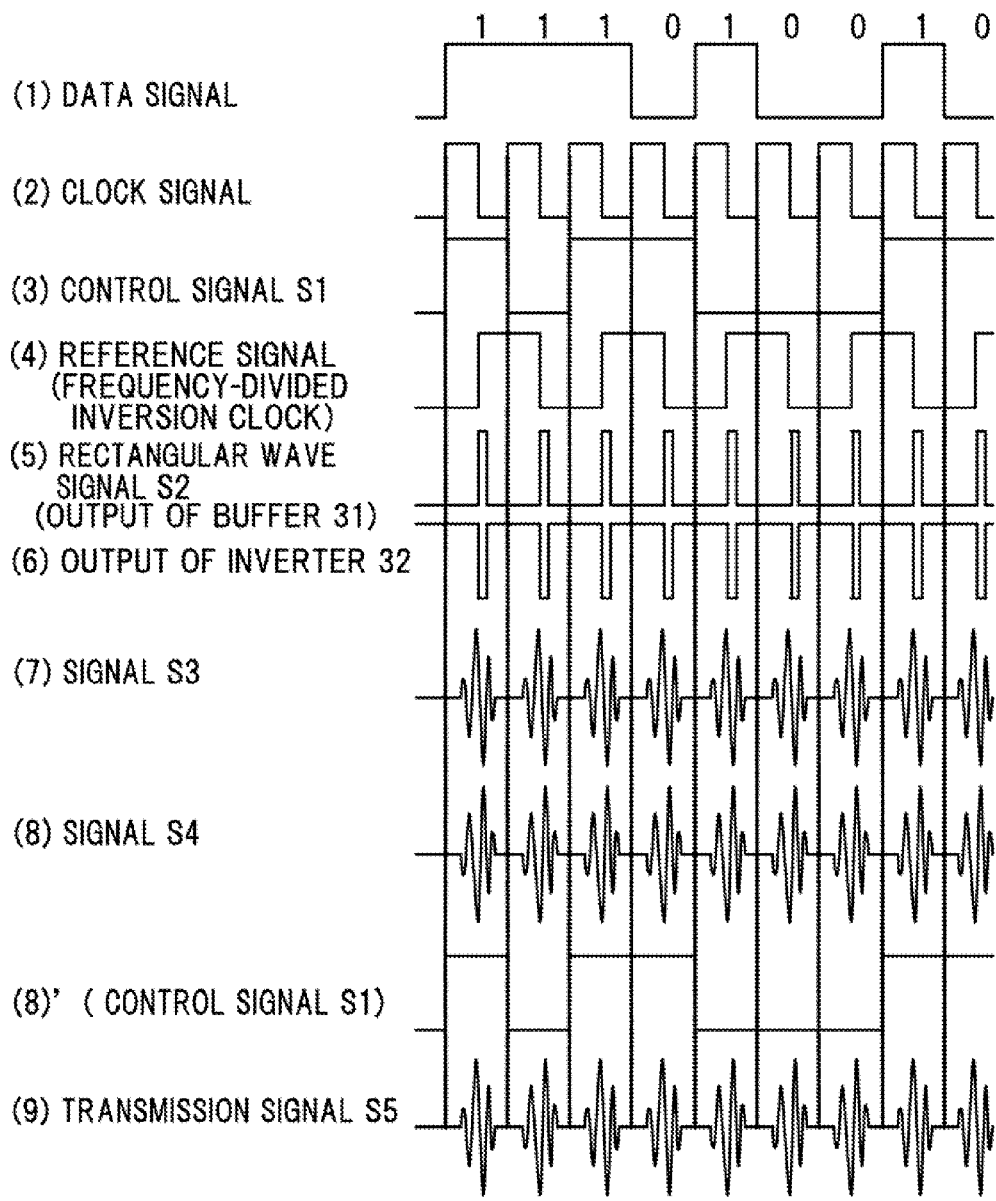

PULSE RADIO TRANSMISSION APPARATUS AND TRANSCEIVER

CROSS-REFERENCE TO RELATED APPLICATIONS

This application is based upon and claims the benefit of priority from the prior Japanese Patent Application No. 2008-065133, filed on Mar. 14, 2008, the entire contents of which are incorporated herein by reference.

FIELD

The present invention relates to a pulse radio transmission apparatus which transmits a signal based on a pulse.

BACKGROUND

Radio transmission apparatuses based on a pulse scheme are utilized for radio transmission systems of ultrawide band (UWB) which includes a microwave band and a quasi-millimeter wave band.

In the pulse radio transmission apparatus, a base-band signal outputted from a base-band signal generator is converted into a pulse by a pulse generator. In addition, the pulse is band-limited and is turned into a wave packet by a band-pass filter. Subsequently, the wave packet is amplified by a transmission amplifier, and the wave packet is transmitted from an antenna through a transmission/reception changeover switch (RF switch). On the other hand, a signal received by the antenna is amplified by a reception amplifier through the transmission/reception changeover switch. In addition, the signal is band-limited by a band-pass filter, the signal is detected by a wave detector, such as envelope detector, and a base-band signal is regenerated by a base-band signal regenerator.

As compared with a narrow-band communication scheme, such a pulse scheme has a feature that an oscillator or a mixer is unnecessary, so the RF section becomes simple in configuration and low in cost. Thus, the radio transmission of a wide band exceeding 10 Gbps may be realized in a millimeter wave band for which a wide band can be utilized.

The configuration of a transmission apparatus in a pulse radio transmission apparatus disclosed in JP-A-2006-303705 is illustrated in FIG. 10A, while the operation of the transmission apparatus is illustrated in FIG. 10B. In the configuration, a rectangular wave signal (a pulse signal) generated by an XOR circuit by delaying a clock signal is applied to a transmission signal generation unit, and is modulated with a data signal so as to be outputted as a transmission signal. An RF switch (reference numeral 35 in FIG. 10A) for turning ON/OFF the RF pulse signal with the data signal is employed for the transmission signal generation unit. If a frequency band which the pulse radio transmission apparatus uses is, for example, a microwave band, problems may be slight. However, when the frequency band becomes a millimeter wave band exceeding 30 GHz, wide-band and high-speed switching characteristics are required of the RF switch. However, the wide-band and high-speed RF switch is very expensive and is large, thus causing the problem that the transmission apparatus will be large in size and high in a fabrication cost.

SUMMARY

According to an aspect of the invention, a radio transmission apparatus includes a first duty adjustment circuit which changes a duty of a clock signal, a second duty adjustment circuit which changes the duty of the clock signal to a duty different from the duty of the clock signal changed by the first duty adjustment circuit, a first AND circuit which takes a logical product between a data signal and the clock signal having passed through the first duty adjustment circuit, and a second AND circuit which takes a logical product between an output signal of the first AND circuit and the clock signal having passed through inversion of the output of the second duty adjustment circuit to generate a pulse signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 illustrates the simulation results of the operation of the first embodiment of the invention;

FIGS. 10A and 10B are a diagram illustrating a pulse radio transmission apparatus and the time chart of the pulse radio transmission apparatus, respectively.

DESCRIPTION OF THE PREFERRED EMBODIMENTS

Figure 1:
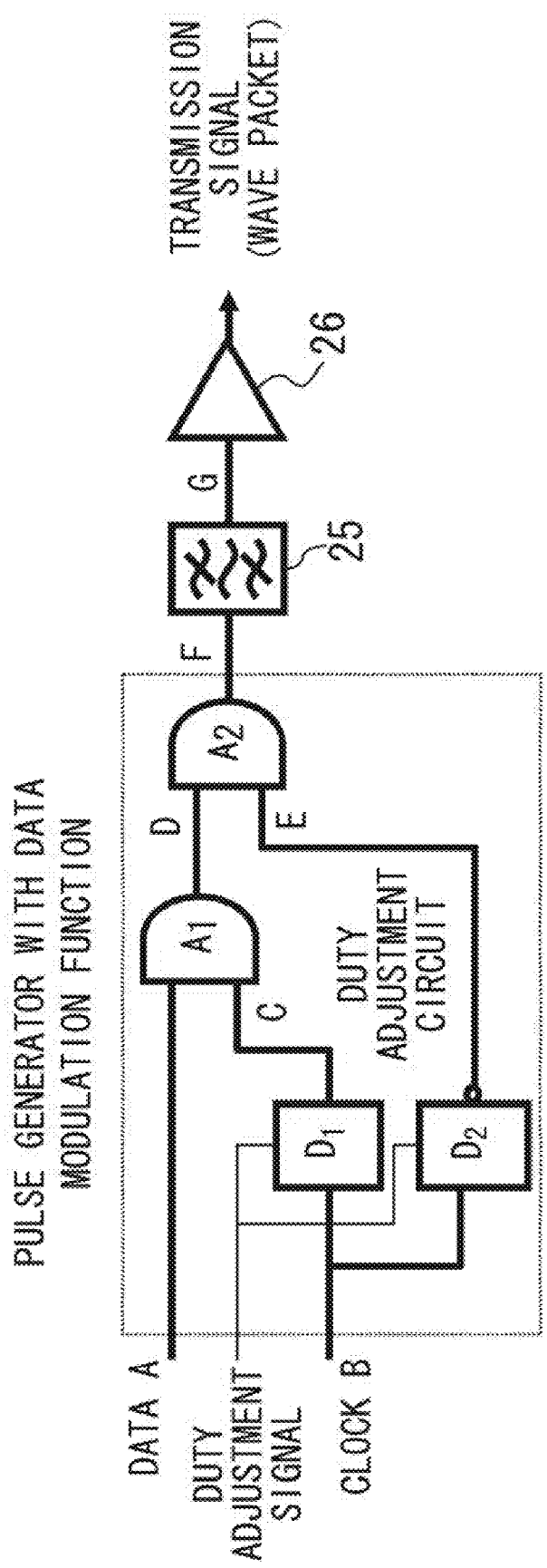
FIG. 1 is a diagram illustrating a pulse radio transmission apparatus according to a first embodiment of the present invention.
Figure 2:
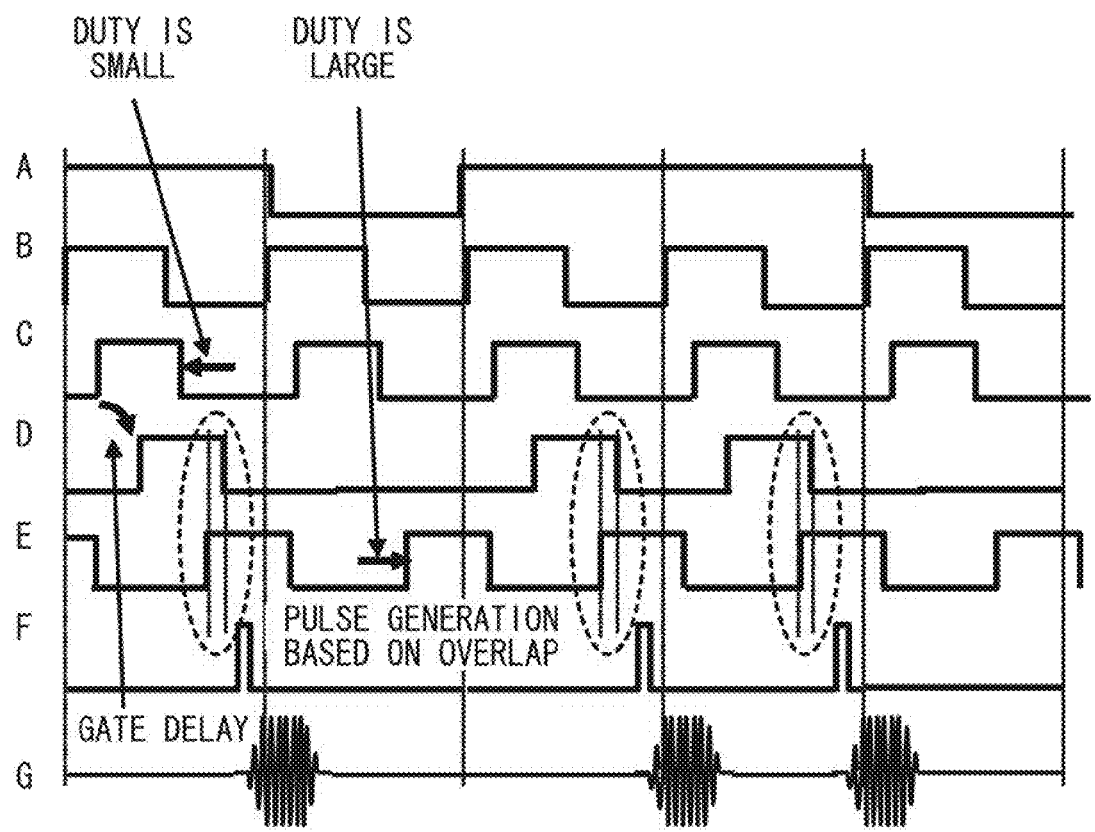
FIG. 2 is a diagram illustrating the time chart of the first embodiment of the invention.

FIG. 1 illustrates a pulse radio transmission apparatus according to a first embodiment of the present invention. FIG. 2 illustrates the time chart of the first embodiment.

The pulse radio transmission apparatus includes a first AND circuit A1, a second AND circuit A2, a first duty adjustment circuit D1, a second duty adjustment circuit D2, a band-pass filter 25, and a transmission amplifier 26. The pulse radio transmission apparatus makes a short pulse which is known as an impulse. A clock signal B is inputted to the duty adjustment circuits D1 and D2, and the output of the duty adjustment circuit D2 is logically inverted to generate two sorts of clock signals C and E whose duty ratios differ from each other. In the illustration of FIG. 2, delay times ascribable to the circuits are also considered. The AND circuit A1 outputs the logical product between the generated clock signal C and a data signal A. Subsequently, the output signal D of the AND circuit A1 and the clock signal E are applied to the AND circuit A2 to take a logical product and to generate a pulse signal at each part where the output signal D and the clock signal E overlap. The pulse signal thus generated is passed through the band-pass filter 25 so as to extract an RF component. Thereafter, the RF component is amplified by the transmission amplifier 26 and is radiated into the air through an antenna. In the embodiment of the invention, the composite signal D (logical product signal) between the data signal A and the clock signal C is generated by the AND circuit A1. Further, the logical product between the composite signal D and the clock signal E is taken to generate the pulse signal. Therefore, an RF switch that is necessary in the prior-art circuit becomes unnecessary. In the configuration of the invention, in principle, a pulse can be generated without the duty adjustment circuits, but the width of a pulse signal in that case is regulated by the propagation delay time of the AND circuit A1. In an pulse radio apparatus, a necessary pulse width differs depending upon the frequency band that is used. In case of utilizing a millimeter wave band, a pulse which is shorter than the propagation delay time of the AND circuit A1 may be required. Therefore, the configuration in FIG. 1 that can control the pulse width by employing the duty adjustment circuits D1 and D2 is preferable.

Figure 3:
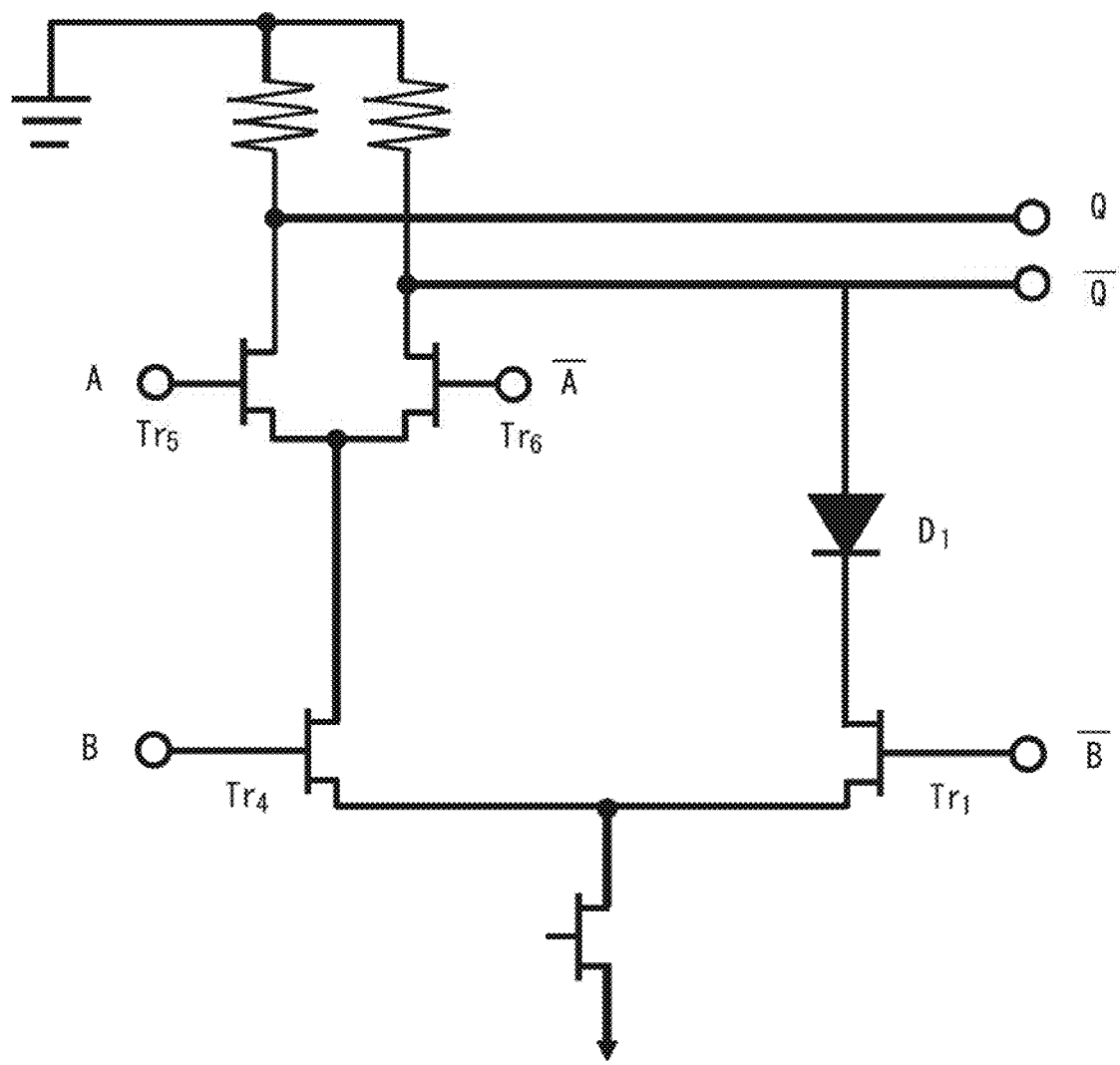
FIG. 3 is a diagram illustrating an example of an AND circuit in the first embodiment of the invention.

FIG. 3 is a diagram illustrating an example of the AND circuits A1 and A2 in the first embodiment of the invention.

The example in FIG. 3 illustrates a differential circuit which employs transistors.

Inputs are signals A, A (bar), B, and B (bar). The two signals A and A (bar) indicate a differential input. Likewise, the two signals B and B (bar) indicate a differential input. The signal A is applied to the transistor Tr5, while the signal A (bar) is applied to the transistor Tr6. The signal B is applied to the transistor Tr4, while the signal B (bar) is applied to the transistor Tr1. The circuit in FIG. 3 is a circuit which takes the AND between the signal A and the signal B. Outputs are signals Q and Q (bar), which indicate the AND between the signals A and B.

Figure 4A:
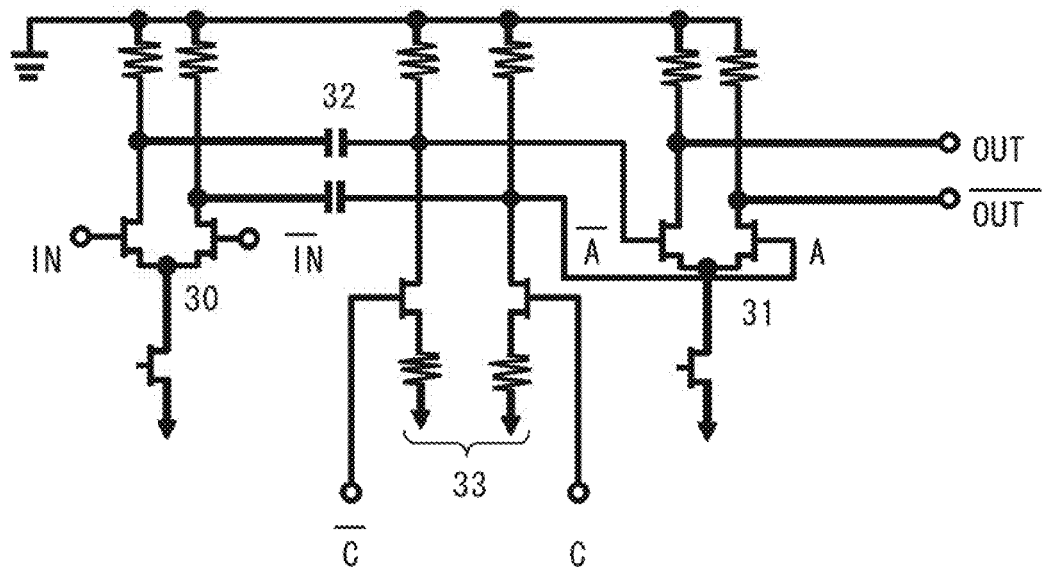
FIGS. 4A and 4B illustrate examples of a duty adjustment circuit and the time chart of the duty adjustment circuit, respectively.
Figure 4B:
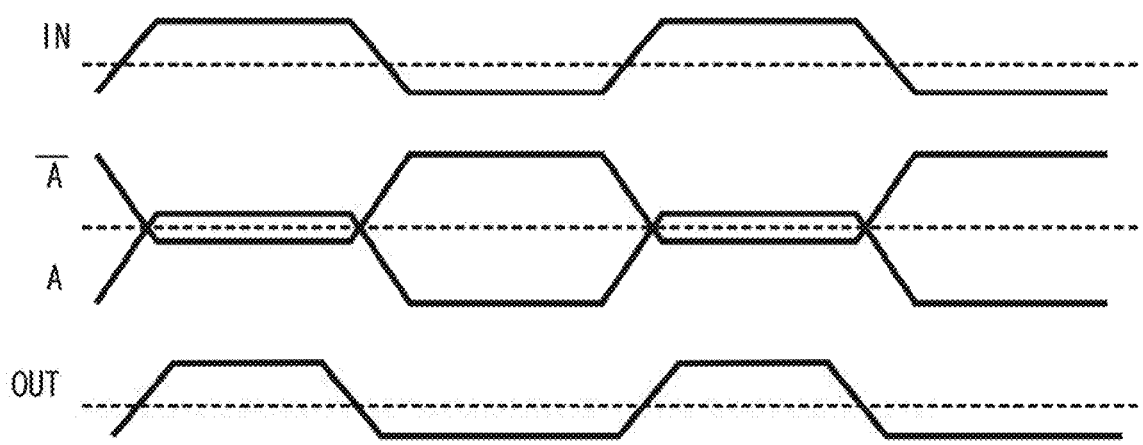

FIG. 4A illustrates an example of a duty adjustment circuit, for example D1 or D2. FIG. 4B illustrates the time chart of the duty adjustment circuit of FIG. 4A.

The duty adjustment circuits D1 and D2 include a first differential circuit 30, a second differential circuit 31, AC coupling capacitors 32, and bias circuits 33. The duty adjustment circuits D1 and D2 adjust the currents flowing through the bias circuits 33 by differential control signals C and C (bar), create an offset between the differential output signals of the first differential circuit 30, and amplify the differential signal having undergone the offset by the second differential circuit 31 to obtain a desired duty. The AC coupling capacitors 32 are used because the clock signal has a single frequency.

As illustrated in FIG. 4B, each of the duty adjustment circuits D1 and D2 applies the bias C to the differential input of a signal IN to change a point at which one of signals A and A (bar) crosses the other. Thus, the point of the waveform of an output OUT at which a threshold value is crossed is changed to change the duty. Here, the duty decreases in a case where the signal C is "high".

FIG. 5 illustrates the simulation results of the operation of the first embodiment of the invention.

The RF switch can be removed, and a smaller size and a lower cost can be realized. In addition, as seen in FIG. 5, since an output pulse is not influenced by the data, jitter is reduced, so a higher quality is attained. FIG. 5 illustrates that the output pulse has a pulse width (full width at half maximum; FWHM) of 6 ps, an amplitude of 1.14 V, a time jitter of 0.14 ps, and an amplitude jitter smaller than 10 mV, and that a high quality pulse has been formed.

Figure 6:
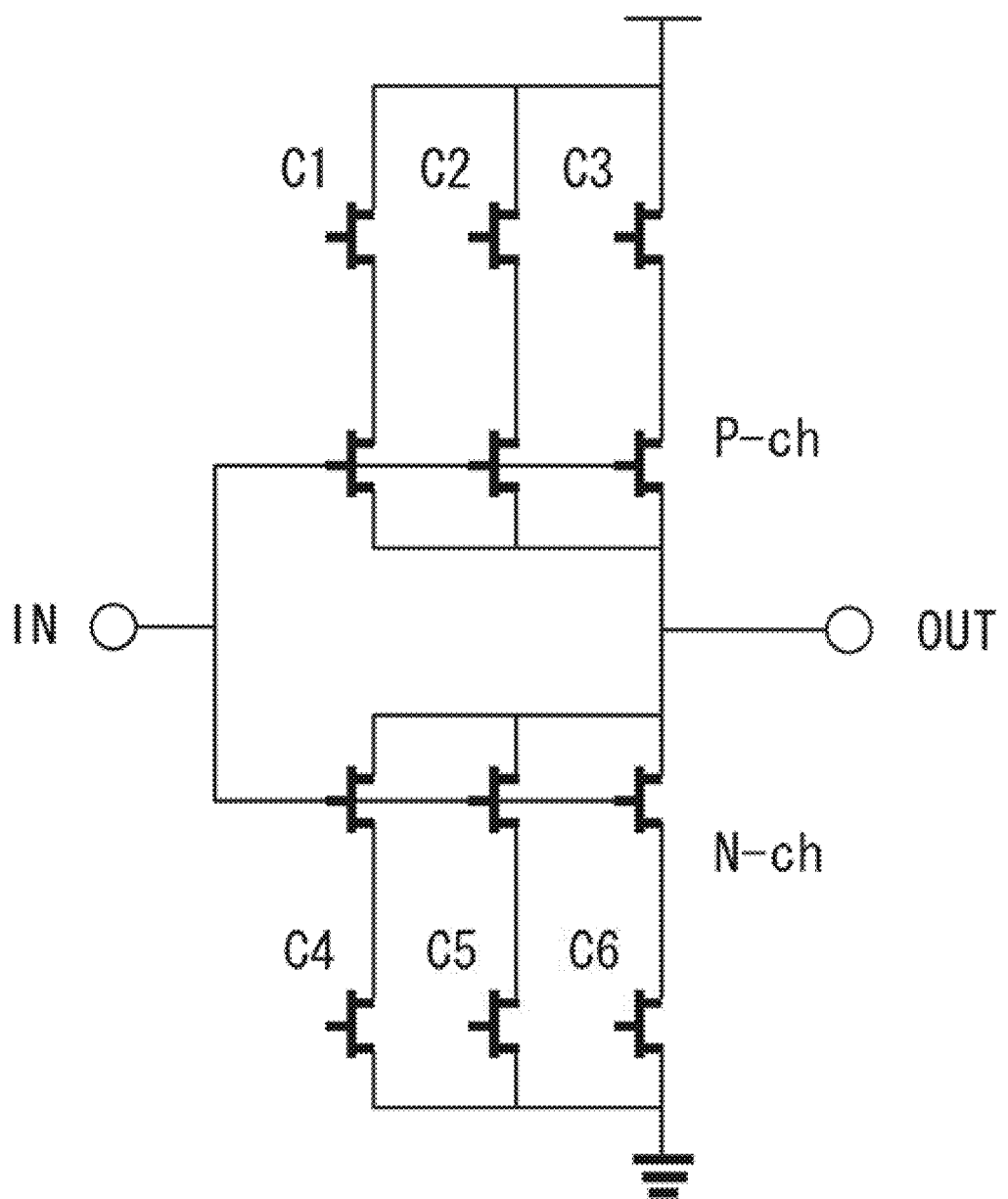
FIG. 6 illustrates an example in which the duty adjustment circuit is configured of CMOS elements.

FIG. 6 illustrates an example in which the duty adjustment circuits D1 and D2 are configured of CMOS elements.

The number of the MOS transistors which are disposed in parallel and which are operated as p-ch loads and n-ch drivers by control signals Cn (n=1, to n) is discretely changed, and the number of the p-ch loads and the number of the n-ch drivers are changed. Thus, the example becomes a circuit in which the duty is adjusted by changing the sign change position of the signal of the circuit. More specifically, when the number of the transistors that are the p-ch loads is larger than the number of the transistors that are the n-ch drivers, an output signal becomes larger in a plus signal portion, and the whole signal moves in a plus direction. In the reverse case, the output signal becomes larger in a minus signal portion, and the whole signal moves in a minus direction. Thus, the position of the part at which the threshold value crosses the signal becomes different, and the duty is varied in a case where a rectangular wave has been generated.

Figure 7:
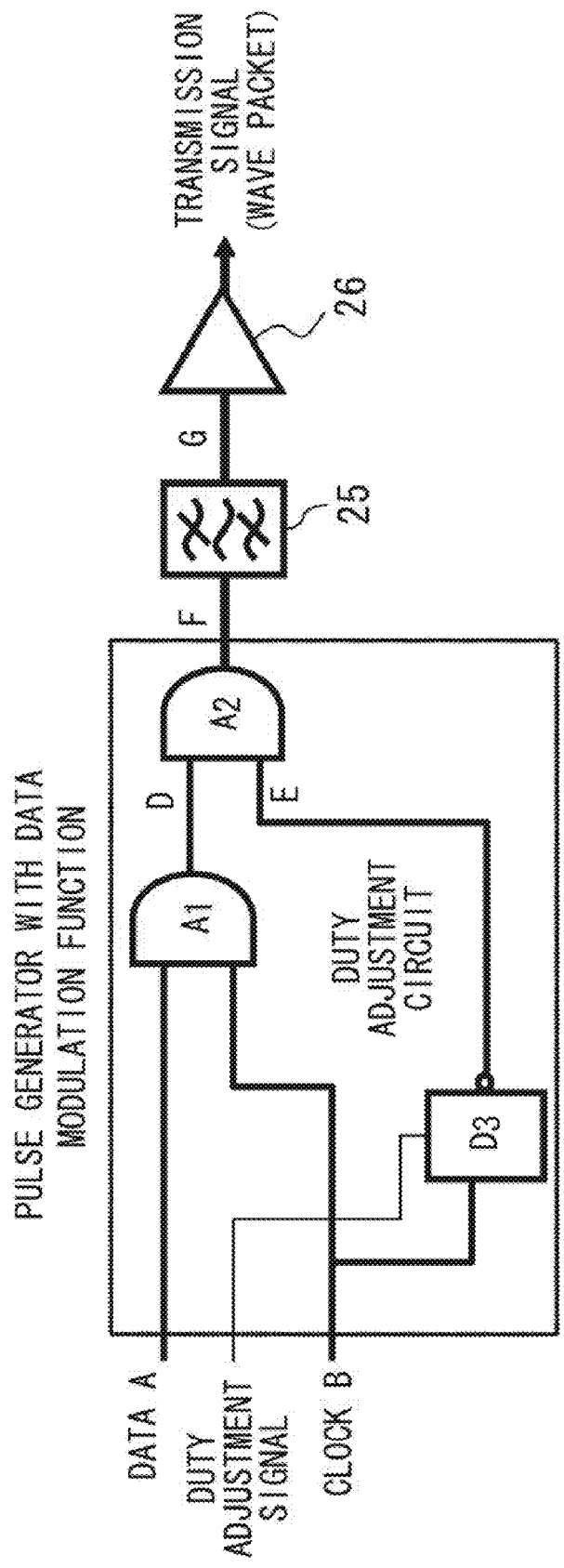
FIG. 7 is a diagram illustrating a pulse radio transmission apparatus according to a second embodiment of the invention.
Figure 8:
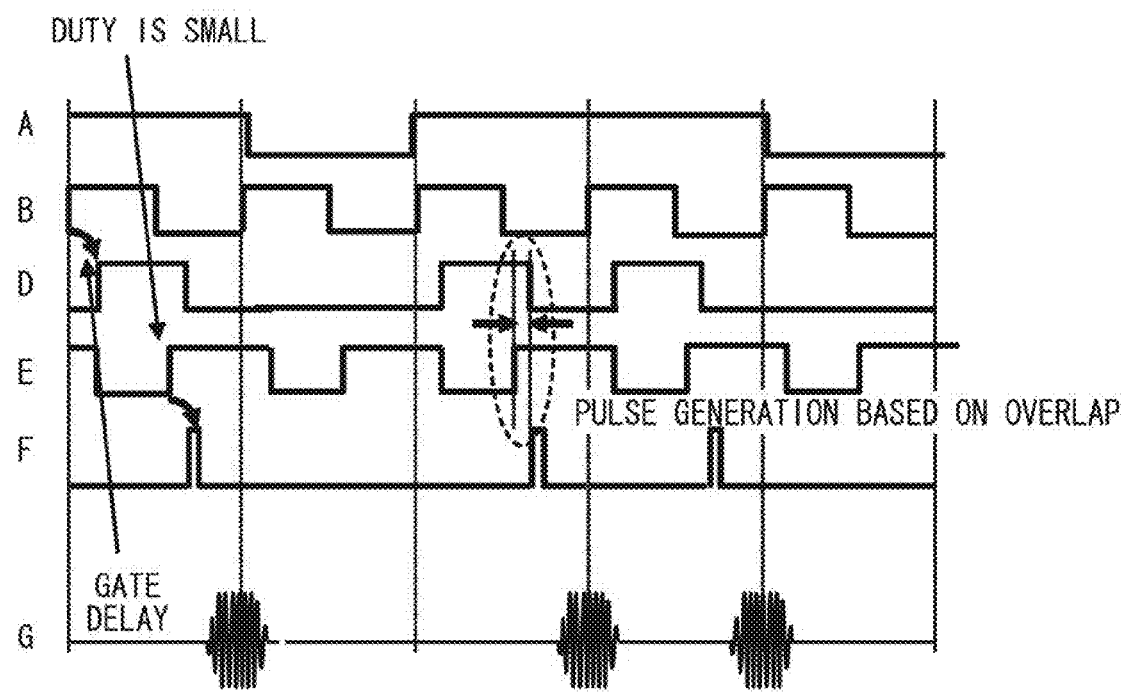
FIG. 8 is a diagram illustrating the time chart of the second embodiment of the invention.

FIGS. 7 and 8 are diagrams illustrating the second embodiment of the invention.

In the time chart of FIG. 8, the delays of circuits are also considered. A pulse generator with a data modulation function in the second embodiment includes a duty adjustment circuit D3, AND circuits A1 and A2, a band-pass filter 25, and an amplifier 26. As illustrated in FIGS. 7 and 8, a signal D is generated by the logical product between data A and a clock B. Also, the duty of the clock B is varied, and the logic thereof is inverted to generate a signal E. The logical product between the signal D and the signal E is taken, whereby a pulse F is generated of the overlap part of the signals D and E. The pulse F is band-limited by the band-pass filter 25 to generate an RF pulse signal G, which is amplified by the amplifier 26 so as to be transmitted. The pulse width of the pulse F is adjusted by the adjustment of the duty in the duty adjustment circuit D3. Since only one duty adjustment circuit is disposed unlike in the case of FIG. 1, the adjustment range of the pulse width is limited, but desired advantages can be realized even with the configuration of FIG. 7.

In accordance with the embodiment of the invention, it is possible to reduce the size, lower the cost and lower the power consumption of an pulse radio transmission apparatus, and it is also possible to enhance the quality of a transmission signal.

Figure 9:
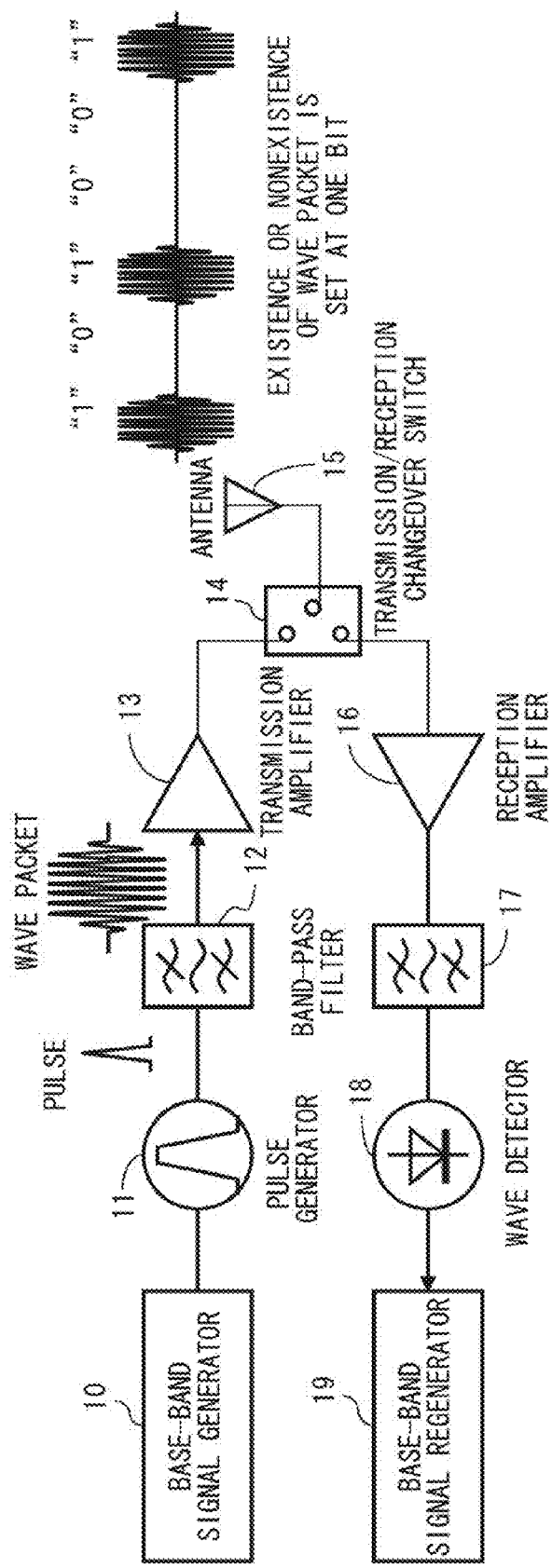
FIG. 9 is a block diagram of a transceiver.

FIG. 9 is diagram of a transceiver, for example a UWB pulse transceiver, using a pulse generator according to the embodiment of the present invention. The UWB pulse transceiver can be used in a radar system, or the like. Note that the pulse generator according to the present embodiment can be used in the radar system and also in a communication device, and the like, which generally uses pulses.

Furthermore, the present invention is not restricted to the embodiments and modifications described above, but may be variously altered within a scope not departing from the gist of the invention.

What is claimed is:

1. A radio transmission apparatus comprising:
a first duty adjustment circuit which changes a duty ratio of a clock signal and outputs a clock signal with a changed duty ratio;
a second duty adjustment circuit which changes the duty ratio of the clock signal to a duty ratio different from the duty ratio of the clock signal changed by the first duty adjustment circuit and outputs a clock signal with a changed duty ratio;
a first AND circuit which takes a logical product between a data signal and the clock signal output by the first duty adjustment circuit; and a second AND circuit which takes a logical product between an output signal of the first AND circuit and the clock signal obtained through inversion of the clock signal output by the second duty adjustment circuit to generate a pulse signal.

2. A radio transmission apparatus according to claim 1, further comprising:
a band-pass filter which extracts an RF signal from the pulse signal.

3. A radio transmission apparatus according to claim 2, further comprising:
a transmission amplifier which amplifies the RF signal.

4. A radio transmission apparatus according to claim 1, wherein the duty ratio of the clock signal is adjusted by the first duty adjustment circuit or the second duty adjustment circuit to control a pulse width of the pulse signal.

5. A radio transmission apparatus according to claim 1, wherein each of the first duty adjustment circuit and the second duty adjustment circuit includes:
a first differential circuit;
an offset circuit in which a flowing current is adjusted by a differential control signal outputted from the first differential circuit to create an offset between differential output signals of the first differential circuit; and
a second differential circuit which amplifies the differential signals having undergone the offset to obtain a desired duty ratio.

6. A radio transmission apparatus according to claim 1, wherein each of the first duty adjustment circuit and the second duty adjustment circuit includes:
a first differential transistor pair which accepts differential inputs and which delivers differential outputs;
a bias portion which provides biases to the respective differential outputs of the first differential transistor pair independently of each other; and
a second differential transistor pair which accepts the outputs of the first differential transistor pair that has been biased by the bias portion, and which delivers differential outputs.

7. A radio transmission apparatus according to claim 1, wherein each of the first duty adjustment circuit and the second duty adjustment circuit includes:
a P-channel transistor group in which a plurality of transistors having their gates applied with an input signal and having their sources connected to an output terminal are connected in parallel; and
an N-channel transistor group in which a plurality of transistors having their gates applied with the input signal and having their drains connected to the output terminal are connected in parallel.

8. A transceiver comprising:
a base-band signal generator which generates a base-band signal;
a radio transmitter which converts the base-band signal into a pulse train;
a first band-pass filter which limits a band of the generated pulse train;
a transmission amplifier which amplifies the pulse train having passed through the first band-pass filter;
a reception amplifier which amplifies a signal received from an antenna;
a switch which performs changeover between transmission of the pulse train from the transmission amplifier, to the antenna, and transmission of the signal received from the antenna, to the reception amplifier;
a second band-pass filter which limits a band of the signal having passed through the reception amplifier; a wave detector which detects the signal having passed through the second band-pass filter; and
a regenerator which regenerates the base-band signal from the detected signal;
wherein the radio transmitter includes:
a first duty adjustment circuit which changes a duty ratio of a clock signal and outputs a clock signal with a changed duty ratio;
a second duty adjustment circuit which changes the duty ratio of the clock signal to a duty ratio different from the duty ratio of the clock signal changed by the first duty adjustment circuit and outputs a clock signal with a changed duty ratio;
a first AND circuit which takes a logical product between a data signal and the clock signal output by the first duty adjustment circuit; and
a second AND circuit which takes a logical product between an output signal of the first AND circuit and the clock signal obtained through inversion of the clock signal output by the second duty adjustment circuit to generate a pulse signal.

9. A transceiver according to claim 8, wherein the duty ratio of the clock signal is adjusted by the first duty adjustment circuit or the second duty adjustment circuit to control a pulse width of the pulse signal.

10. A transceiver according to claim 8, wherein each of the first duty adjustment circuit and the second duty adjustment circuit includes:
a first differential circuit;
an offset circuit in which a flowing current is adjusted by a differential control signal outputted from the first differential circuit to create an offset between differential output signals of the first differential circuit; and
a second differential circuit which amplifies the differential signals having undergone the offset to obtain a desired duty ratio.

11. A transceiver comprising:
a base-band signal generator which generates a base-band signal;
a radio transmitter which converts the base-band signal into a pulse train signal;
a first band-pass filter which limits a band of the generated pulse train signal;
a transmission amplifier which amplifies the pulse train having passed through the first band-pass filter;
a reception amplifier which amplifies a signal received from an antenna;
a switch which performs changeover between transmission of the pulse train signal from the transmission amplifier, to the antenna, and transmission of the signal received from the antenna, to the reception amplifier;
a second band-pass filter which limits a band of the signal having passed through the reception amplifier;
a wave detector which detects the signal having passed through the second band-pass filter; and
a regenerator which regenerates the base-band signal from the detected signal;
wherein the radio transmitter includes:
a duty adjustment circuit which changes a duty ratio of a clock signal and outputs a clock signal with a changed duty ratio;
a first AND circuit which takes a logical product between the base-band signal and the clock signal; and
a second AND circuit which takes a logical product between an output signal of the first AND circuit and the clock signal output by the duty adjustment circuit to generate the pulse train signal.

12. A transceiver according to claim 11, wherein the duty ratio of the clock signal is adjusted by the duty adjustment circuit to control a pulse width of the pulse signal.

13. A transceiver according to claim 11, wherein the duty adjustment circuit includes:
   a first differential circuit;
   an offset circuit in which a flowing current is adjusted by a differential control signal outputted from the first differential circuit to create an offset between differential output signals of the first differential circuit; and
   a second differential circuit which amplifies the differential signals having undergone the offset to obtain a desired duty ratio.

* * * * *